United States Patent
Wen et al.

(10) Patent No.: US 11,514,697 B2
(45) Date of Patent: Nov. 29, 2022

(54) PROBABILISTIC TEXT INDEX FOR SEMI-STRUCTURED DATA IN COLUMNAR ANALYTICS STORAGE FORMATS

(71) Applicant: Oracle International Corporation, Redwood Shores, CA (US)

(72) Inventors: Jian Wen, Hollis, NH (US); Hamed Ahmadi, Burnaby (CA); Sanjay Jinturkar, Santa Clara, CA (US); Nipun Agarwal, Saratoga, CA (US); Lijian Wan, San Bruno, CA (US); Shrikumar Hariharasubrahmanian, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 270 days.

(21) Appl. No.: 16/929,949

(22) Filed: Jul. 15, 2020

(65) Prior Publication Data
US 2022/0019784 A1    Jan. 20, 2022

(51) Int. Cl.
*G06V 30/40*    (2022.01)
*G06F 16/13*    (2019.01)
(Continued)

(52) U.S. Cl.
CPC .............. *G06V 30/40* (2022.01); *G06F 16/13* (2019.01); *G06F 21/6254* (2013.01);
(Continued)

(58) Field of Classification Search
None
See application file for complete search history.

(56) References Cited

U.S. PATENT DOCUMENTS

| 5,625,711 A | * | 4/1997 | Nicholson | ............ | H04N 1/4115 |
| | | | | | 382/229 |
| 5,729,637 A | * | 3/1998 | Nicholson | ............ | G06V 10/987 |
| | | | | | 382/282 |

(Continued)

FOREIGN PATENT DOCUMENTS

| CN | 101036141 A | * | 9/2007 | ......... | G06F 16/2237 |
| CN | 104079424 A | * | 10/2014 | ............. | G06F 3/044 |

(Continued)

OTHER PUBLICATIONS

Wikipedia, "Bitmap Index", https://en.wikipedia.org/w/index.php?title=Bitmap_index&oldid=921777233, Oct. 2019, 8 pages.

(Continued)

*Primary Examiner* — Mohammed Rachedine
(74) *Attorney, Agent, or Firm* — Hickman Becker Bingham Ledesma LLP; Brian N. Miller

(57) ABSTRACT

Herein is a probabilistic indexing technique for searching semi-structured text documents in columnar storage formats such as Parquet, using columnar input/output (I/O) avoidance, and needing minimal storage overhead. In an embodiment, a computer associates columns with text strings that occur in semi-structured documents. Text words that occur in the text strings are detected. Respectively for each text word, a bitmap, of a plurality of bitmaps, that contains a respective bit for each column is generated. Based on at least one of the bitmaps, some of the columns or some of the semi-structured documents are accessed.

20 Claims, 7 Drawing Sheets

(51) Int. Cl.
  *G06F 21/62* (2013.01)
  *G06F 40/289* (2020.01)
  *G06F 16/22* (2019.01)
  *G06F 16/81* (2019.01)
  *G06K 9/62* (2022.01)

(52) U.S. Cl.
  CPC ......... *G06F 40/289* (2020.01); *G06K 9/6215* (2013.01); *G06V 30/43* (2022.01)

(56) References Cited

U.S. PATENT DOCUMENTS

| | | | |
|---|---|---|---|
| 5,926,812 | A | 7/1999 | Hilsenrath |
| 7,257,569 | B2 | 8/2007 | Elder |
| 7,499,915 | B2 | 3/2009 | Chandrasekar |
| 7,644,014 | B2 | 1/2010 | Viswanath |
| 7,877,400 | B1 | 1/2011 | Matthew |
| 8,086,606 | B1 | 12/2011 | Xu |
| 8,549,006 | B2 | 10/2013 | Amer-Yahia et al. |
| 8,578,261 | B1 | 11/2013 | Gupta |
| 9,659,045 | B2 | 5/2017 | Liu et al. |
| 10,394,814 | B2 | 8/2019 | White |
| 10,657,617 | B1 * | 5/2020 | Wang .................. G06T 7/73 |
| 10,977,251 | B1 * | 4/2021 | Gibas .................. G06F 16/282 |
| 2005/0044089 | A1 | 2/2005 | Wu |
| 2005/0228791 | A1 | 10/2005 | Thusoo |
| 2006/0015482 | A1 | 1/2006 | Beyer |
| 2006/0036657 | A1 | 2/2006 | Cheslow |
| 2006/0064432 | A1 | 3/2006 | Pettovello |
| 2007/0255748 | A1 | 11/2007 | Ferragina |
| 2008/0010256 | A1 | 1/2008 | Lindblad |
| 2008/0065596 | A1 | 3/2008 | Shadmon |
| 2008/0120283 | A1 | 5/2008 | Liu |
| 2008/0243799 | A1 | 10/2008 | Rozich |
| 2009/0307241 | A1 | 1/2009 | Schimunek et al. |
| 2009/0063538 | A1 | 3/2009 | Chitrapura |
| 2009/0177960 | A1 | 7/2009 | Lemoine |
| 2010/0174983 | A1 * | 7/2010 | Levy .................. G06F 40/117 715/256 |
| 2010/0325169 | A1 | 12/2010 | Loh |
| 2011/0016157 | A1 | 1/2011 | Bear et al. |
| 2011/0113036 | A1 | 5/2011 | Idicula et al. |
| 2011/0179016 | A1 | 7/2011 | Narula |
| 2011/0302482 | A1 * | 12/2011 | Warnock ............. G06Q 30/06 715/201 |
| 2012/0036133 | A1 | 2/2012 | Chen et al. |
| 2013/0086096 | A1 | 4/2013 | Indeck et al. |
| 2014/0032615 | A1 | 1/2014 | Hammerschmidt et al. |
| 2014/0095519 | A1 | 4/2014 | Liu et al. |
| 2016/0239527 | A1 | 8/2016 | Jang et al. |
| 2016/0294651 | A1 | 10/2016 | Renna |
| 2017/0060912 | A1 | 3/2017 | Liu |
| 2017/0344749 | A1 | 11/2017 | Yang et al. |
| 2018/0075105 | A1 | 3/2018 | Chavan et al. |
| 2018/0268000 | A1 | 9/2018 | McManus |
| 2018/0349422 | A1 | 12/2018 | Tsuchida et al. |
| 2020/0110476 | A1 * | 4/2020 | Yoshidome ............. G06F 3/038 |
| 2020/0125751 | A1 | 4/2020 | Hariharasubrahmanian et al. |
| 2020/0250192 | A1 | 8/2020 | Roelke et al. |
| 2021/0209088 | A1 | 7/2021 | Zheng et al. |
| 2021/0286806 | A1 | 9/2021 | Ahmadi et al. |

FOREIGN PATENT DOCUMENTS

| | | | | |
|---|---|---|---|---|
| CN | 104881470 | A * | 9/2015 | ......... G06F 16/1744 |
| CN | 110569396 | A * | 12/2019 | ......... G06F 16/9024 |
| WO | WO 03/107222 | A1 | 12/2003 | |
| WO | WO 2015/041967 | A1 | 3/2015 | |
| WO | WO 2015/069941 | | 5/2015 | |
| WO | WO 2017/070188 | A1 | 4/2017 | |

OTHER PUBLICATIONS

Rohan Karanjawala, "All You Need to Know About Parquet File Structure in Depth", Available: https://www.linkedin.com/pulse/all-you-need-know-parquet-file-structure-depth-rohan-karanjawala, Jan. 7, 2020.

Melnik et al., "Dremel: Interactive Analysis of Web-Scale Datasets", Association for Computing Machinery, vol. 54, No. 6, Jun. 2011, 10 pages.

Lee et al., "Processing SPARQL queries with regular expressions in RDF databases", BMC bioinformatics vol. 12 Suppl 2, Suppl 2 S6., Mar. 29, 2011, doi:10.1186/1471-2105-12-S2-S6, 2011.

Fujioka et al., "Application of Bitmap Index to Information Retrieval", NTT CyberSpace Laboratories, NTT Corporation, WWW 2008/ Poster Paper, Apr. 2008, 2 pages.

Cho et al., "A Fast Regular Expression Indexing Engine", Proceedings 18th International Conference on Data Engineering, doi:10.1109/ICDE.2002.994755., 2002, pp. 419-430.

Borok-Nagy et al., "Speeding Up SELECT Queries with Parquet Page Indexes", Cloudera Blog, Available: https://blog.cloudera.com/speeding-up-select-queries-with-parquet-page-indexes/, Jan. 21, 2020.

"Parquet-format/README.md", Github.com, Available: https://github.com/apache/parquet-format/blob/b490da8da82d302f6dadf13fe67633fb1051d79c/README.me, Oct. 7, 2019.

"Parquet-format/PageIndex.md", Github.com, Available: https://github.com/apache/parquet-format/blob/b490da8da82d302f6dadf13fe67633fb1051d79c/PageIndex.md, Jun. 25, 2019.

"Index in Parquet", stackoverflow.com, last edited Dec. 31, 2018, available: https://stackoverflow.com/questions/26909543/index-in-parquet, 2018.

Liu, U.S. Appl. No. 15/162,235, filed May 23, 2016, Notice of Allowance, dated Jul. 1, 2019.

Liu, et al., U.S. Appl. No. 13/783,141, filed Mar. 1, 2013, Interview Summary, dated Jul. 10, 2017.

Liu, U.S. Appl. No. 13/783,141, filed Mar. 1, 2013, Advisory Action, dated Jul. 21, 2017.

Liu, U.S. Appl. No. 13/783,141, filed Mar. 1, 2013, Appeal Brief, Nov. 15, 2017.

Liu, U.S. Appl. No. 13/783,141, filed Mar. 1, 2013, Examiners Answers, Jun. 14, 2018.

Liu, U.S. Appl. No. 13/783,141, filed Mar. 1, 2013, Examiners Answers, Jul. 12, 2018.

Liu, U.S. Appl. No. 13/783,141, filed Mar. 1, 2013, Final Office Action, dated Apr. 17, 2019.

Liu, U.S. Appl. No. 13/783,141, filed Mar. 1, 2013, Interview Summary, dated Feb. 7, 2020.

Liu, U.S. Appl. No. 13/783,141, filed Mar. 1, 2013, Interview Summary, dated Nov. 13, 2017.

Liu, U.S. Appl. No. 13/783,141, filed Mar. 1, 2013, Office Action, dated Nov. 6, 2019.

Liu, U.S. Appl. No. 13/783,141, filed Mar. 1, 2013, Interview Summary, dated Jul. 12, 2019.

Liu, U.S. Appl. No. 15/162,235, filed May 23, 2016, Final Office Action, dated Oct. 2, 2018.

U.S. Appl. No. 13/783,141, filed Mar. 1, 2013, Advisory Action, dated Jul. 17, 2015.

Liu, U.S. Appl. No. 15/162,235, filed May 23, 2016, Office Action, dated May 3, 2018.

Liu, U.S. Appl. No. 13/783,141, filed Mar. 1, 2013, Final Office Action, dated May 10, 2017.

Lui, U.S. Appl. No. 15/162,235, filed May 23, 2016, Interview Summary, dated Oct. 2, 2018.

U.S. Appl. No. 13/783,141, filed Mar. 1, 2013, Office Action, dated Oct. 30, 2014.

U.S. Appl. No. 13/783,141, filed Mar. 1, 2013, Final Office Action, dated May 13, 2015.

U.S. Appl. No. 13/783,141, filed Mar. 1, 2013, Final Office Action, dated Jul. 8, 2016.

U.S. Appl. No. 13/783,141, filed Mar. 1, 2013, Interview Summary, dated Dec. 10, 2015.

U.S. Appl. No. 13/783,141, filed Mar. 1, 2013, Office Action, dated Sep. 3, 2015.

(56) References Cited

OTHER PUBLICATIONS

U.S. Appl. No. 13/783,141, filed Mar. 1, 2013, Office Action, dated Nov. 9, 2016.
Liu, U.S. Appl. No. 13/783,141, filed Mar. 1, 2013, Final Office Action, dated Apr. 14, 2018.
Microsoft Docs, "Columnstore indexes—Query performance", dated Jan. 11, 2019, https://docs.microsoft.com/en-us/sql/relational-databases, 11 pages.
Aizawa, Akiko, "An information-theoretic perspective of tf-idf measures", Information Processing and Management 39, dated 2003, 21 pages.
Anonymous: "Oracle Database In-Memory: Powering the Real-Time Enterprise", dated Dec. 31, 2014, 9 pages.
Anonymous:, "Intverted Index—Wikipedia", dated Jan. 9, 2016, https://en.wikipedia.org/w/index.ph p?title=Inverted_index&oldid=698960983, 4 pages.
Biatecki et al., "Apache Lucene 4", SIGIR 2012 Workshop on Open Source Information Retrieval. Dated Aug. 16, 2012, Portland, OR USA., 8 pages.
Candillier et al., "Mining XML Documents" In: Data Mining Patterns: New Methods and Applications, dated Nov. 19, 2007, IGI Global, 28 pages.
GitHub, "Parquet", parquet-format/README.md, last viewed on Jul. 15, 2020, https://github.com/apache/parquet-format/blob/f1de77d31936f4d50f1286676a0034b6339918ee/README.md 9 pages.
GitHub.com, "Analytics querying performance (aka, think about what to do with analytics)", https://github.com/18F/api.data.gov/issues/235, dated May 26, 2015, 27 pages.
Kanchan et al., "Survey paper on Generalized Inverted Index for Keyword Search", e-ISSN: 2278-067X, p-ISSN: 2278-800X, www.ijerd.com, vol. 10, Issue 4 (Apr. 2014), pp. 69-73.
Kaushik et al., "On the Integration of Structure Indexes and Inverted Lists", SIGMOD dated Jun. 13-18, 2004, AMC, 12 pages.
Kononenko et al., "Mining Modern Repositories with Elasticsearch", MSR '14, May 31-Jun. 1, 2014, Hyderabad, India, 4 pages.
Manber et al., "GLIMPSE: A Tool to Search Through Entire File Systems", TR 93-34, dated Oct. 1993, 11 pages.
Abello et al., "Data Warehousing, Handbook of Massive Datasets", dated Apr. 1, 2002, Springer, 4 pages.
McHugh et al., "Lore: a Database Management System for Semistructured Data", SIGMOD, vol. 26 No. 3, dated Sep. 3, 1997, 14 pages.
Zemmar et al., "A Survey of Indexing Techniques in Natives XML Databases", Inernational Arab Conference on Information Technology, dated Dec. 11, 2011, 8 pages.
Microsoft Docs, "Query with Full-Text Search", dated Mar. 14, 2017, 12 pages.
Niwattanakul et al., "Using of Jaccard Coefficient for Keywords Similarity", International MultiConference of Engineers and Computer Scientists 2013 vol. I, dated Mar. 2013, 6, pages.
Patil et al., "Inverted Indexes for Phrases and Strings", SIGIR'11, Jul. 2011, ACM, Beijing, China, 10 pages.
Roth et al., "Don't' Scrap It Wrap it!, A Wrapper Architecture for Legacy Data Sources", Proceedings of the International Conference on Very Largedata Bases, dated Aug. 26, 1997, 10 pages.
Twitter Blog, "Dremel made simple with Parquet", dated Sep. 11, 2013, https://blog.twitter.com/engineering/en_us/a/2013/dremel-made-simple-with-parquet.html, 12 pages.
Wan et al., "When Optimizer Chooses Table Scans: How to Make Them More Responsive", ACM, dated 2018 Association for Computing Machinery, 10 pages.
Wikipedia, "B+ Tree", dated Sep. 25, 2012, https://en.wikipedia.org/windex.php?title=B+_tree&oldid=514568173, 6 pages.
Wikipedia, the free encyclopedia, "Apache Avro", https://en.wikipedia.org/wiki/Apache_Avro, last viewed on Dec. 28, 2015, 2 pages.
Wikipedia, the free encyclopedia, "BSON", last viewed on Dec. 28, 2015, https://en.wikipedia.org/wiki/Bson, 3 pages.
Wikipedia, the free encyclopedia, "Protocol Buffers", last viewed on Dec. 28, 2015, https://en.wikipedia.org/wiki/Protocol_Buffers, 3 pages.
Wu et al., "Ginix: Generalized Inverted for Keyword Search", IEEE Transactions on Knowledge and Data Mining vol. 8 No. 1 Year 2013, 11 pages.
Yu et al., "Two birds, one stone: a fast, yet lightweight, indexing scheme for modern database systems", dated Nov. 2016, 5 pages.
Mathis et al., "XML Indexing and Storage: Fulfilling the Wish List", Computer Science Res Dev. Springer Published Online Feb. 1, 2012, 18 pages.
Skolnik, Herman "Multiterm Index: Information Storage and Retrieval", Journal of Chemical Documentation, vol. 10, No. 2, DOI: https://doi.org/10.1021/c160037a003, dated May 1, 1970, 4 pages.
Lam et al., "Entry Pairing in Inverted File", International Conference on Web Information Systems Engineering, DOI: 10.1007/978-3-642-04409-0_50, dated Oct. 5, 2009, 12 pages.

* cited by examiner

FIG. 1
| ORIGINAL INDEX 110 | | COLUMN A | COLUMN B | COLUMN C |
|---|---|---|---|---|
| | | BIT 0 | BIT 1 | BIT 2 |
| WORD(S) | | | | |
| "CAR" | BITMAP C | YES | YES | YES |
| "ROAD" | BITMAP D | YES | NO | NO |
| "BIKE" | BITMAP E | NO | NO | NO |
| COMPARISON | | SIMILARITY |
|---|---|---|
| BITMAP C | BITMAP D | NO |
| BITMAP C | BITMAP E | NO |
| BITMAP D | BITMAP E | YES |
| REDUCED INDEX 120 | | COLUMN A | COLUMN B | COLUMN C |
|---|---|---|---|---|
| | | BIT 0 | BIT 1 | BIT 2 |
| WORD(S) | | | | |
| "CAR" | BITMAP C | YES | YES | NO |
| "ROAD" or "BIKE" | BITMAP F | YES | NO | NO |
COMPUTER 100
DOCUMENT 131
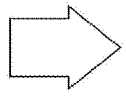
DOCUMENT 132
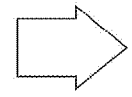

FIG. 4

| Datetime | Title | tags | content | comments |
|---|---|---|---|---|
| "2020/02/02 02:02:02" | "Sample Blog Title" | "tags": [ "some", "tags" ] | "Bob said something..." | { "username": "alice", "email": "alice@example.com", "comment": "Bob didn't say that...", "replies": [ { "username": "bob", "email": nil, "comment": "> Bob didn't say that...\n\nYes I did.", "replies": [] }, { "username": "bob", "email": nil, "comment": "Why does it matter if I had said?" } ] } |

```
{
  "datetime": "2020/02/02 02:02:02",
  "title": "Sample Blog Title",
  "tags": [ "some", "tags" ],
  "content": "Bob said something...",
  "comments": [
    {
      "username": "alice",
      "email": "alice@example.com",
      "comment": "Bob didn't say that...",
      "replies": [
        {
          "username": "bob",
          "email": nil,
          "comment": "> Bob didn't say that...\n\nYes I did.",
          "replies": []
        },
        {
          "username": "bob",
          "email": nil,
          "comment": "Why does it matter if I had said?"
        }
      ]
    }
  ]
}
```

PROBABILISTIC TEXT INDEX FOR SEMI-STRUCTURED DATA IN COLUMNAR ANALYTICS STORAGE FORMATS

CROSS-REFERENCE TO RELATED APPLICATION

Incorporated herein in its entirety is related U.S. patent application Ser. No. 16/814,855 "PERSONAL INFORMATION INDEXING FOR COLUMNAR DATA STORAGE FORMAT" filed on Mar. 10, 2020 by Hamed Ahmadi et al. The following non-patent literature (NPL) are incorporated herein by reference in their entirety:

"DREMEL MADE SIMPLE WITH PARQUET" by Julien Le Dem, published Sep. 11, 2013, available at: https://blog.twitter.com/engineering/en_us/a/2013/dremel-made-simple-with-parquet.html "APACHE PARQUET" published Oct. 16, 2017, available at:
https://github.com/apache/parquet-format/blob/f1de77d31936f4d50f1286676a0034b6339918ee/README.md

FIELD OF THE INVENTION

The present invention relates to query acceleration for a collection of semi-structured text documents. Herein are full-text search techniques based on bitmap keyword indices and columnar persistence.

BACKGROUND

Semi-structured content is widely used for persisting information because it provides an optimal compromise between both formally "structured" and naturally "unstructured" content. Semi-structured data usually has better readability and is readily consumable by a human. Semi-structured data can also be processed programmatically because of the well-defined structural properties that facilitate encoding, tokenizing, parsing, and/or some semantic analysis. For example, typical webpage content is generally semi-structured, human readable, and easily processed by scripting languages due to a well-defined format specified by a formal standard such as hypertext markup language (HTML), JavaScript object notation (JSON), or extensible markup language (XML).

Because semi-structured data is human readable, searching both structured and unstructured fields with a natural free-form text search is quite common. An important characteristic of such a search is that the specified text may appear in any part of the semi structured text.

Doing searches as above efficiently is important in some domains. For instance, in the European Union's (EU) General Data Protection Regulation (GDPR), a "right to be forgotten" requires that all records that pertain to a specified personal text string be located and deleted on demand. This exercise has to be done within a narrow window of time. Therefore, it is necessary to have tools to assist in the search process to execute this efficiently, especially when an unknown few of some hundreds of millions of available semi-structured documents are involved.

At an application level, supporting semi-structured text search usually involves construction of inverted indices. This is common in search applications such as Lucene, among others. Inverted indices can accelerate search proportional to the log of the document size, which is usually several orders of magnitude. However, such a text index is almost as large as the data itself. This precludes an inverted index from being included inside a content file itself as it would double the storage footprint of the file. Therefore, typically indices are instead separately kept in archival or otherwise less expensive bulk durable storage.

BRIEF DESCRIPTION OF THE DRAWINGS

In the drawings:

FIG. 1 is a block diagram that depicts an example computer that accelerates searching for text words in a datastore such as a database of semi-structured documents;

FIG. 4 is a block diagram that depicts an example mapping of JavaScript object notation (JSON) fields to Parquet columns;

DETAILED DESCRIPTION

Figure 2:
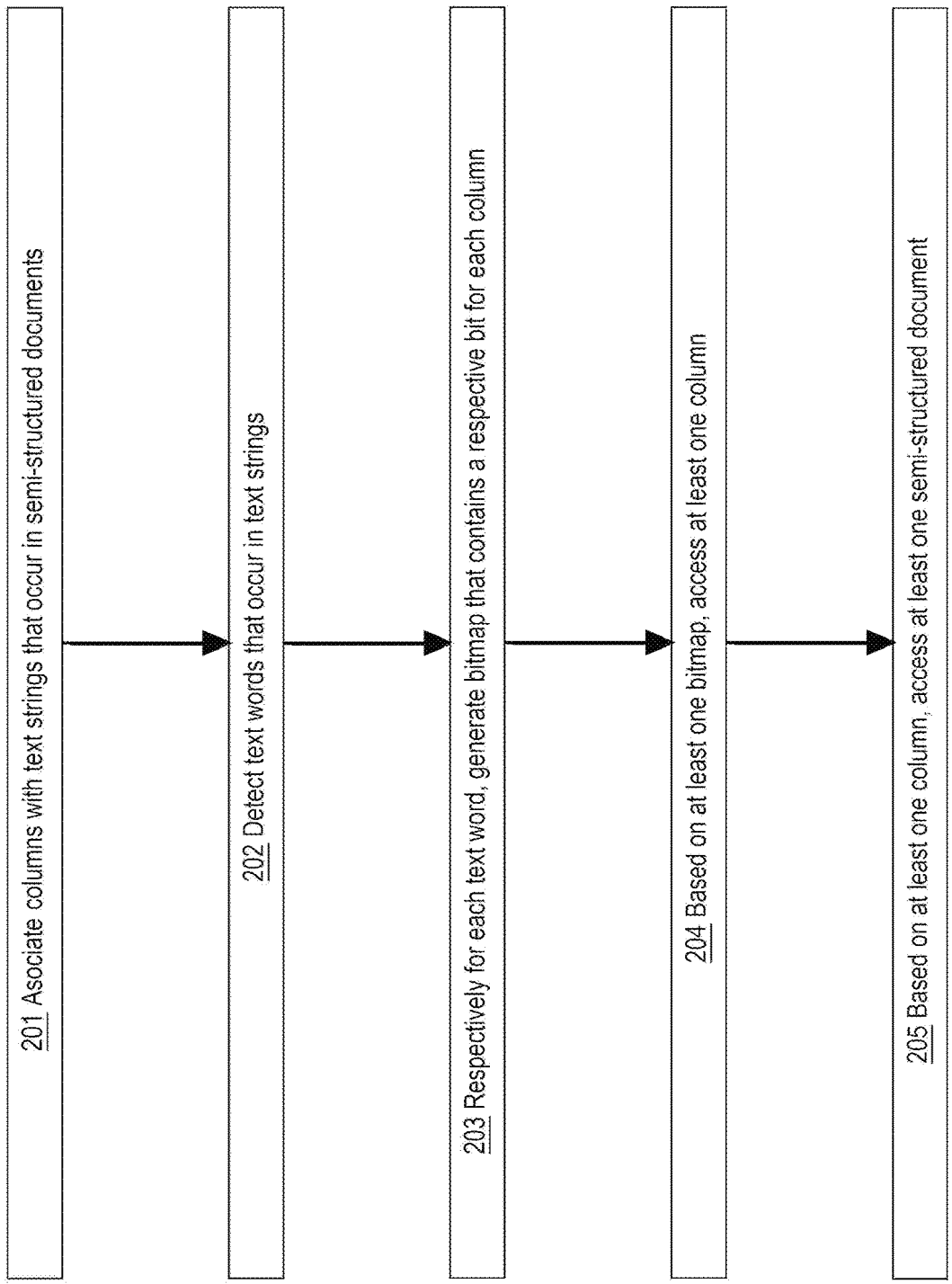
FIG. 2 is a flow diagram that depicts an example process that accelerates searching for text words in a datastore such as a database of semi-structured documents.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is a probabilistic indexing technique for searching semi-structured text in columnar storage formats such as Parquet, using columnar I/O avoidance, and needing minimal index storage overhead. When semi-structured content is parsed into separate data columns, structural information can be maintained through a database schema or other descriptive metadata, so the resulting columnar data is more or less equivalent to the original input data. A text search over the original semi-structured text can be mapped to queries on the ingested columnar data. This works efficiently so long as the queries are applied to few columns containing the structured data, but becomes inefficient when the search has to be done for the entire semi-structured content.

A technical problem is that a text-search query expects that data-of-interest could be in any of many fields in the original semi-structured text, so query execution should not look only on an individual field. A search over all fields for a keyword will be as expensive as a full-table scan, which is usually inefficient and not recommended.

Techniques herein solve this technical problem by creating an index over the original semi-structured data and embedding the index into the Parquet columnar file format. Approaches herein combine a probabilistic text search index with Parquet columnar format and achieve I/O avoidance by filtering Parquet columns and row-groups using the index.

The index comprises a bitmap per searchable word. Each bitmap indicates which column contains the respective word.

In an embodiment, a computer associates columns with text strings that occur in semi-structured documents. Text words that occur in the text strings are detected. Respectively for each text word, a bitmap, of a plurality of bitmaps, that contains a respective bit for each column is generated. Based on at least one of the bitmaps, some of the columns or some of the semi-structured documents are accessed.

1.0 Example Computer

FIG. 1 is a block diagram that depicts an example computer 100, in an embodiment. Computer 100 accelerates searching for text words in a datastore such as a database of semi-structured documents.

Computer 100 may be one or more computers such as: rack servers such as blades, personal computers, mainframes, virtual computers, or other computing devices. When computer 100 has multiple computers, the computers are interconnected by a communication network. In volatile or nonvolatile storage of computer 100 or remote storage, computer 100 can access many semi-structured text documents such as 131-132 that may reside in file(s) or a bulk datastore such as a database.

In this example, document 131 contains JavaScript object notation (JSON). Document 132 contains extensible markup language (XML). In any case, documents 131-132 are semi-structured because their content may be a mix of: a) parsed text such as unquoted punctuation characters in document 131-132 or extensible markup language (XML) names of elements and attributes in document 132, and b) free form text such as: quoted text in documents 131-132, and free form text such as "Notes about route." in document 132. In an embodiment, a semi-structured document may be a binary object, such as a file or binary large object (BLOB), that contains a mix of binary data and text strings.

Demarcation of text strings within documents 131-132 depends on the embodiment. For example, JSON and XML have respective formal grammars based on contextual occurrences of whitespace and punctuation. Computer 100 may use a JSON or XML parser to recognize and/or extract contextual text strings from documents. Parser embodiments include streaming tokenizers such as simple API (application program interface) for XML (SAX), and parse tree generators such as for a document object model (DOM).

Although some text is shown as quoted in documents 131-132, enclosing quotes are not included in values of text strings. In document 131, text strings are quoted. In document 132, text strings may or may not be quoted. For example, four of the separate text strings that computer 100 can individually access in document 132 are: "Car-Plan", "mode", "not by bike", and "Notes about route." Although documents 131-132 show nearly identical content and structure, additional documents may have same or different content and/or structure.

Full text search entails searching for a substring in some or all of the text strings in some or all of available documents. Although computer 100 can individually access text strings in documents, some techniques resort to linear scanning of whole documents 131-132 to search for a substring. Even if text strings in documents are redundantly stored in a database and indexed, a database index is unsuitable because it only tracks whole text strings. If text strings are segregated into various database columns such as A-C, a database index is even less suitable because only one column is indexed by a database index. The Hadoop data warehouse framework lacks database indices. Although an inverted index can handle portions of text strings, the size of an inverted index is typically nearly as large as the indexed column, which may be unsuitable at the scale of a data warehouse.

In an embodiment, computer 100 persists columns A-C that store values including text strings. A column is a one-dimensional vector of values that may have a similar meaning and/or a same datatype. For example, each value stored in column B may be limited to a text string that indicates a destination place of a journey such as "car garage" as shown in documents 131-132.

Depending on the scenario or embodiment, some stored text strings may have apparently arbitrary values. In any case, at least some of columns A-C contain at least some natural language values. Natural language contains recognizable words that may occur in columns A-C such as 'car', 'road', and 'bike' as shown in original index 110.

Documents 131-132 may be hierarchical with semi-structured content nested within semi-structured content such as shown. In an embodiment, which column stores a text string depends on where in the hierarchy, including which nesting level, does the text string occur in a document. Mapping fields in hierarchical semi-structured content to columns of same or different relational tables is presented in related non-patent literature (NPL) "DREMEL MADE SIMPLE WITH PARQUET".

Computer 100 may derive an inventory of some or all distinct words that occur in columns A-C of original index 110. Depending on the embodiment, computer 100 may derive that word inventory by: a) extracting words from columns A-C, or b) observing words during data ingestion into columns A-C from an external source such as during extraction, transformation, and loading (ETL) such as from documents 131-132. For example as discussed later herein, semi-structured documents such as 131-132 or property files of name-value pairs may be parsed by computer 100 into text strings, and the text strings are then persisted into columns A-C of original index 110. Such a text string may contain: a) a single word such as a name or value of a property or attribute, b) multiple words such as a term, phrase, sentence, or paragraph, or c) apparently arbitrary or mangled text such as a telephone number, acronym, or universal resource locator (URL).

Tokenizing may decompose a multiword text string such as "Notes about route." into individual words such as according to internal separator characters such as whitespace and/or punctuation. For example, column A may contain a value such as "road-for-car" as shown from which three individual words 'road', 'for', and 'car' may be detected. For each word in computer 100's word inventory, a bitmap such as C-E may be generated as an index that indicates which columns A-C contain that word. As shown, bitmaps C-D are respectively generated for 'car' and 'road'.

Bitmap D contains a bit 0-2 respectively for each column A-C that contains text strings. For example as shown, bit 0 of bitmap D says 'yes' to indicate that 'road' occurs in column A. Likewise, bit 1 of bitmap D says 'no' to indicate that 'road' does not occur in column B. Likewise, bit 1 of bitmap C says 'yes' to indicate that 'car' occurs in column B. Thus, bitmaps C-E may be used as indices to detect which columns contain text strings that contain which words. In various embodiments, the bitmaps are or are not case sensitive such that 'car', 'Car', and 'CAR' are same or different words.

Columns A-C may contain millions of values that collectively contain thousands of distinct words. Thus even if only thousands of bitmaps are generated, their generation may entail tokenizing millions of text strings. Tokenization effort is increased when text strings are long. For example, a SQL VARCHAR2 value may contain tens of thousands of characters. In an embodiment, tokenization and/or generation of bitmaps C-E may be scheduled such as nightly such as when an inelastic cluster of computers is less busy or when using an elastic public cloud is less pricey.

Although suitable for bitmap generation, such offline bulk processing may be unsuitable when bitmaps C-E are later used such as with interactive ad hoc querying or online transaction processing (OLTP). Presented later herein are ways to accelerate query execution by using bitmaps C-E to avoid input/output (I/O) to access columns A-C. For example, bitmap E indicates that 'bike' does not occur in columns A-C. Thus, a search for 'bike' in columns A-C may detect the absence of 'bike' without actually accessing documents 131-132 nor columns A-C.

In an embodiment, columns A-C may be persisted in a columnar file format such as Apache Parquet such as presented in related non-patent literature (NPL) "APACHE PARQUET". Parquet files are self describing such that each file contains metadata needed to parse the file. In an embodiment, bitmaps C-E are stored in metadata in each Parquet file that contains part or all of any column A-C.

As explained in related NPL "APACHE PARQUET", Parquet files are Hadoop filesystem (HDFS) files that may be horizontally partitioned such as for: a) distributed storage such as for horizontal scaling, and/or b) random access such as when partitioned by value range. For example, if records are partitioned by month, then January 2020 records are directly available in an isolated file that can be independently accessed without accessing other data files such as for other months. For example, columns A-B may be persisted together in a same Parquet file, and column C may be persisted in its own Parquet file. Thus, each month may have two files. In an embodiment, bitmaps C-E are decomposed into smaller bitmaps based on which columns reside in which Parquet files. For example when columns A-B are persisted together in a same Parquet file, the bitmaps persisted in that Parquet file may contain only bits 0-1 that are for respective columns A-B. Whereas the other Parquet file that persists only column C may contain bitmaps that contain only bit 2 that is for column C.

Documents 131-132 may hierarchically nest many substructures, and different documents may nest different substructures. There may be hundreds of distinct nestable substructures that are possible, each having dozens or hundreds of possible fields that map to distinct respective columns such as A-C. Thus, there may be hundreds or thousands of columns and, thus, hundreds or thousands of Parquet files before horizontal partitioning and tens of thousands of Parquet files after partitioning. As explained above, each word in computer 100's word inventory may have its own bitmap, and there may be thousands of words and thousands of bitmaps, each of which may be replicated in metadata of each of the thousands of Parquet partition files. Thus, bitmap persistence itself may overburden available storage.

That technical problem is solved herein by combining bitmaps in original index 110 for different respective words to generate reduced index 120 that has fewer bitmaps. Thus while original index 110 may have too many bitmaps to feasibly replicate into each Parquet partition file, reduced index 120 has few enough bitmaps to be readily replicated into each Parquet partition file. Reduced index 120 is generated as follows.

Bitmaps of original index 110 are compared in pairs to detect which bitmaps are similar. For example, all possible pairings of bitmaps C-E may be compared. Whether two bitmaps are similar depends on the similarity criteria and/or threshold of the embodiment. In an embodiment, two bitmaps are similar if they have same values for same bits 0-2.

Bitmaps in original index 110 that are similar are combined into a single bitmap of a same amount of bits in reduced index 120. All of the bitmaps in reduced index 120 have distinct values, because any bitmaps in original index 110 sharing same values for all bits are combined into one bitmap. For example, pervasive words occur in all columns A-C. In original index 110 such pervasive words each has a respective bitmap with all bits set to 'yes', but in reduced index 120 there is only a single bitmap shared by all such pervasive words.

In the embodiment shown in the middle table, two words are similar if their bitmap values differ by at most one bit. For example as shown, bitmaps D-E are similar because all of their bits 1-2 have a same value in both bitmaps. Only bit 0 has different values in bitmaps D-E, so bitmaps D-E differ by only one bit, which indicates similarity of bitmaps D-E. Thus, bitmaps D-E are combined into bitmap F in reduced index 120. Thus reduced index 120 contains fewer bitmaps than original index 110.

The combination of bitmap D for 'road' and bitmap E for 'bike' into bitmap F means that bitmap F is for both 'road' and 'bike'. In an embodiment, bitmaps D-E are combined by bitwise disjunction using bitwise-or. In that case, a bit is set to 'yes' in bitmap F if the same bit is set to 'yes' in either bitmap D or E as discussed later herein.

2.0 Example Word Indexing Process

FIG. 2 is a flow diagram that depicts an example word indexing process that computer 100 may perform to accelerate searching for text words in a datastore such as a database of semi-structured documents. FIG. 2 is discussed with reference to FIG. 1.

The process of FIG. 2 occurs in two phases. The first phase may be so-called offline such as scheduled hourly or nightly. The first phase entails steps 201-203 that generate original index 110 and, in some embodiments, reduced index 120.

Step 201 associates data columns A-C with text strings that occur in semi-structured documents 131-132. For example, each of the text strings may be extracted from one of the documents and then stored into one of the columns. Which column is used depends on: a) a mapping of document fields, such as declared in a document schema, to columns, and b) from which field was the text string extracted. Example results of step 201 that entails shredding a document into text strings that are then stored into columns is shown in FIG. 4.

Various embodiments may enhance step 201 as follows. Text string demarcation and/or extraction may be performed by a tokenizer or parser that: a) indicates addresses or offsets of text strings within a document, and/or b) treats separator strings, such as whitespace and/or punctuation, the same as text strings. For example, "field:'value'" may yield four text strings "field", ":'", "value", and "'".

Preserving separator strings may facilitate reconstruction of the document from the text strings that are stored in the columns. Original documents 131-132 may be deleted as soon as the text strings are persisted in columns. If whole document 131 is later needed, it may be automatically regenerated from the text strings in the columns. Metadata may be persisted, such as in additional columns, such as: a) identifiers of documents from which particular text strings came, and/or b) positions in documents from which particular text strings came. Such metadata may facilitate: a) reconstruction of a deleted document, and/or b) seeking into a document at or near the text string.

Immediately after extraction and before columnar storage, step 201 may convert text strings into only uppercase or lowercase and then store the converted strings, instead of the original strings, into the columns to facilitate later case-insensitive searching.

Step 202 detects texts words that occur in the text strings. A tokenizer may demark and/or extract words in a text string by recognizing whitespace and/or punctuation.

Respectively for each text word, step 203 generates a respective bitmap such as C-D that contains a respective bit for each column A-C. Each bit is set to a Boolean value that may be known as true, false, yes, no, set, clear, on, off, one, or zero. Only bits that correspond to a column that contains the word are set to 'yes'.

Index 110 or 120, including the index's bitmaps, may be persisted in a same file as the columns that are indexed by the index. If two subsets of columns are stored in separate vertical partition files, then each vertical partition file stores a separate index that indexes only a respective subset of columns. Because different indices entail disjoint subsets of columns, the same bit positions in the bitmaps of different indices correspond to different columns. For example as shown, bit positions 0-2 correspond to columns A-C in indices 110 and 120 but, in an index for columns X-Z (not shown), same bit positions 0-2 instead correspond to columns X-Z.

The offline phase finishes when index 110 or 120 is persisted. Eventually an online phase occurs that entails steps 204 and/or 205 depending on the embodiment or scenario. The online phase may participate in various scenarios such as interactive ad hoc querying or online analytical processing (OLAP). In an embodiment, all persisted data and metadata is read only in the online phase. For example, steps 204-205 are suitable for searching an archival storage tier that is read only.

Based on at least one bitmap of index 110 or 120, step 204 accesses at least one column. For example, a query may ask a Boolean question such as whether or not there exists a document that contains 'bike'. Even if original index 110 was discarded after generating reduced index 120, inspecting bitmap F will not provide a false negative. That is, if bits 0-2 of bitmap F were all 'no', then the existence query would be answered as 'no' without accessing columns or documents.

However as shown, bit 0 of bitmap F is 'yes', which is ambiguous and may or may not be a false positive. In that case, step 204 linearly scans column A to find a text string that contains 'bike' as a substring. As shown, no document contains 'bike', which the scan of column A confirms, and: a) although bit 0 of bitmap F provided a false positive, b) the answer to the query is 'no'. Columns B-C do not need loading, accessing, and/or scanning because bits 1-2 of bitmap F are 'no'.

If the query instead asks for identifiers of all documents that contain both 'car' and 'road', then step 204 is more complicated because: a) multiple bitmaps C and F are needed, and b) a text string value in a column should be correlated back to a document that contains the text string. In an embodiment: a) columns A-C are stored in a same columnar file, and b) documents 131-132 have separate columnar files that contain separate indices that contain separate bitmaps. In that case, finding a word in a column entails: a) inspecting a bitmap in each file, and b) scanning the column in none, one, or both files. In which file(s) does the scan find the word indicates which document(s) contain the word.

In an embodiment, documents 131-132 share a same columnar file. Metadata, such as in the file, may indicate, for each column or subsets of columns, a range of value offsets or addresses within the column that correspond to each document. For example, offset metadata may indicate that a first five text strings of column A came from document 131 and a next two text strings of column A came from document 132. Thus if a word is detected in the third text string of column A during a scan, then that word occurs in document 131.

Such offset metadata may be used for somewhat random access such as seeking. For example, if a first hundred text strings in column A came from an array field in document 131 and a second hundred text strings in column A came from the same field in document 132, then a query that asks if the array field contains a word in document 132 may skip the first hundred text strings while scanning column A and stop after scanning the second hundred text strings, such as when column A contains millions of text strings from thousands of documents.

Likewise, if a query that asks for identifiers of all documents that contain the word in the array field stored in column A may be accelerated by: a) finding the word in the tenth text string in column A to confirm that document 131 contains the word in the field, and b) then skipping ninety text strings by seeking to the start of the second hundred text strings to scan document 132's portion of column A.

Similar metadata may indicate which field did a text string in a column come from, such as when multiple fields are stored in a same column. In some cases, step 204 is sufficient to answer a query, and step 205 does not occur. If a query requests retrieval of a whole document or a document portion that spans multiple fields and or columns, then step 205 occurs as follows.

Based on the at least one column accessed in step 204, at least one document is accessed in step 205. For example, available columnar files may include a first file that contains text strings from purchase order documents for perishable goods, a second file for orders for dry goods, and a third file for orders for non-goods such as services rendered. Generating a monthly bill for a customer may entail: a) assigning numeric identifiers to customers, b) recording the customer numbers in a field of purchase order documents, c) in step 203, generating, for each of the three columnar files, a separate bitmap that indicates which columns contain that customer's number, d) in step 204, using the three bitmaps to detect which columnar files contain order data for that customer, and e) scanning, also in step 204, some columns of some of the three files to detect which documents contain the customer number. After detecting which purchase order documents are for that customer, a monthly bill for that customer is generated, in step 205, based on accessing content of those purchase order documents and/or content of some columns of the three files.

3.0 Example Scalable Processing

Figure 3:
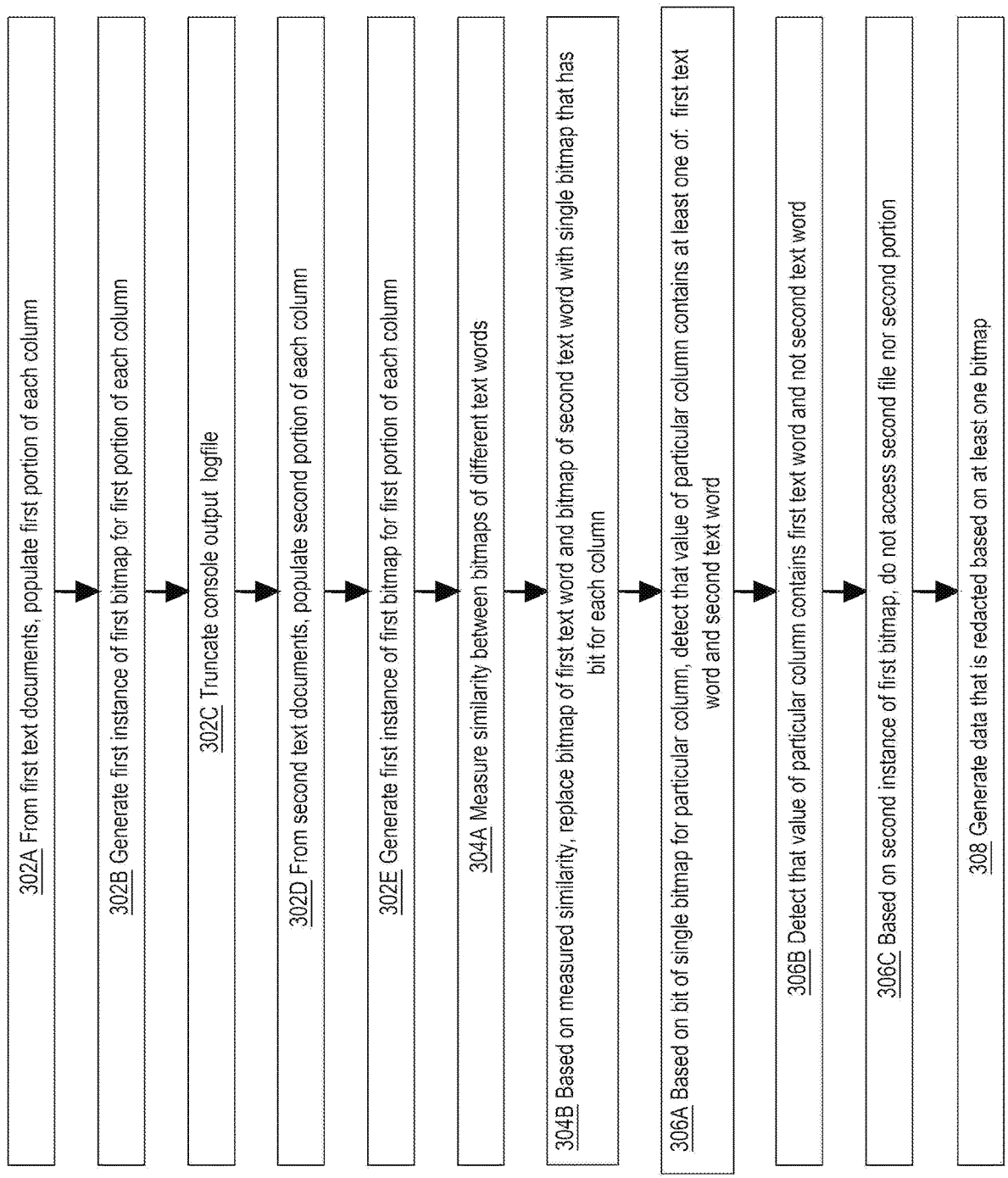
FIG. 3 is a flow diagram that depicts an example accelerated process based on horizontal and vertical scalability of Parquet files.

FIG. 3 is a flow diagram that depicts an example accelerated process based on horizontal and vertical scalability of Parquet files. FIG. 3 is discussed with reference to FIG. 1.

The process of FIG. 3 occurs in two phases. The first phase is preparatory and may occur somewhat offline such as nightly as scheduled as discussed earlier herein. The first phase generates Parquet partition files from semi-structured documents as follows such as described in related NPL "DREMEL MADE SIMPLE WITH PARQUET".

Vertical partitioning occurs when different columns are persisted in separate files as explained earlier herein. An advantage of vertical partitioning is that query execution for a keyword can limit input/output (I/O) by accessing only those columnar files that contain columns that contain that keyword. For example as shown in FIG. 1, 'road' occurs in column A but not columns B-C. Thus according to bitmap D, searching for 'road' need only access Parquet files that contain data for column A.

Horizontal partitioning occurs when data for different sets of documents are stored in separate Parquet files. For example, documents 131-132 may be created on different days. If the Parquet files are horizontally partitioned by day, then content from documents 131-132 is persisted in separate respective Parquet partitions.

Steps 302A-E demonstrate a scenario of a rotating console log that is periodically truncated and refilled with lines of console output such as from standard output (stdout) that include JSON documents inline such as follows. For example, a server program may redirect stdout to the console log, which is truncated to be empty at midnight each night. Thus, an indefinitely long stream of lines of text that spans months or years is associated with a single log file. In another example, there is only a continuous stream of lines of text, but no file.

Each line of text in the console log may contain verbose diagnostic prose such as "July 15: Wrote 26 bytes to ~/dump.bin" that may be parsed to extract name value pairs such as date=July 15, length=26, and file='~/dump.bin'. Some lines of text may contain a JSON document inline such as {date:"July 15", length:26, file:"~/dump.bin"}. In any case, each line of text may be ingested as a separate document, whether JSON or a set of properties.

Each day, a new Parquet horizontal partition may be generated. For example, step 302A populates a July 15 partition of each of columns A-C based on content of lines of text for July 15 in the content log. Step 302B generates a July 15 instance of a bitmap for a word such as 'car' for each July 15 partition file.

At midnight, step 302C truncates the console logfile and begins repopulating the logfile with lines of text on July 16. Step 302D populates a July 16 partition of each of columns A-C based on content of lines of text for July 16 in the content log. Step 302E generates a July 16 instance of a bitmap for the word car for each July 16 partition file.

Steps 304A-B demonstrates generation of reduced index 120. Step 304A measures similarity between bitmaps of different text words. In an embodiment, Jaccard distance is used to measure similarity between two bitmaps. When two bitmaps are compared, bits in a same position in each bitmap are compared, such as bit 0 in bitmap D and bit 0 in bitmap E. Across all of the bit positions, amounts of matched and mismatched bits are counted. For example, bitmaps D-E have two matched bits 1-2 and one mismatched bit 0. The Jaccard distance may be calculated as matches divided by mismatches, which is 2/1=two for bitmaps D-E. For bitmaps C and E, the Jaccard distance is 0/3=zero.

Based on the measured similarity, step 304B replaces bitmaps of two text words with a single bitmap that has a same amount of bits. For example, comparison of bitmaps D-E may satisfy an example threshold Jaccard distance of at least two. In reduced index 120, bitmaps D-E are combined and replaced with bitmap F as explained earlier herein.

Steps 306A-C demonstrate the statistical nature of reduced index 120 that may cause false positives when searching for a word such as 'bike' in a column. Based on bit 0 of bitmap F being set as 'yes', step 306A detects that column A contains 'road' and/or 'bike', which is ambiguous. Step 306B detects that column A contains 'road' but not 'bike'. For example, a linear scan of all values in a partition of column A may detect that the partition of column A contains 'road' but not 'bike'.

Column A may have another partition in another Parquet file that contains another instance of the bitmap that may have a different value for bit 0 such as 'no'. Because bitmaps herein do not cause false negatives, computer 100 can inspect a bitmap to definitively detect that a word is absent in a partition of a column. Based on bit 0 being 'no' for the other partition, step 306C does not access the Parquet file of the other partition of column A when searching for bike in all partitions of column A.

Step 308 demonstrates redaction of a value or deletion of documents that contain the value, either of which may be needed according to various online privacy laws in various nations. For example, a law may forbid publication of home addresses in some scenarios. A website that automatically generates and publishes a biographical webpage of a person may need to redact all occurrences of the person's home street name on the webpage, which may be difficult if the webpage is generated from dozens of semi-structured documents.

Step 308 generates a redacted webpage in which bitmaps herein are used to detect which fields of which documents contain the person's street name. For example, a query engine of computer 100 may return values that are redacted as needed for use by a webpage generator that should never have access to unredacted values. In another example, a law requires deletion, when demanded by a person, of all online data that an organization has about that person.

Bitmaps herein may be used to quickly detect which fields of which documents may contain words of the person's full name, and those matching documents may need further inspection and/or deletion. Whether deleting documents or redacting values, searching for a keyword does not entail linearly searching through content of all available documents. Instead, bitmaps herein may indicate that most documents and/or columns do not contain the keyword, and access of those many nonmatching documents and/or columns can be avoided.

4.0 Example JSON to Columns Mapping

FIG. 4 is a block diagram that depicts an example mapping of JSON fields to Parquet columns, in an embodiment. On the left side of FIG. 4 is an example nesting hierarchy in an example JSON document. On the right side of FIG. 4 is an example Parquet file that contains text strings from the JSON document.

The JSON document has five top-level fields that are mapped to the five similarly-named columns in the Parquet file. In this example, the Parquet file lacks columns for the fields of the substructures that are nested in the JSON document. For example, the 'email' fields in the JSON document do not have their own column in the Parquet file. Instead, the whole 'comments' JSON substructure is stored as a text string value in the comments column of the Parquet file. A bitmap for the word 'blog' that contains a bit set as 'no' that corresponds to the comments column can confirm that no comment mentions 'blog'.

In this example, tags as shown is an application-specific concept. In another example, occurrences of XML element names, such as <name></name>, also known as tags, are recognized as words that may have bitmaps as presented herein. For example, another Parquet file may have a tags column whose values are all of the element names that occur in XML document(s).

5.0 Exemplary Ingestion With Index Formation

The following exemplary embodiment has additional features. These additional features include linguistics such as stemming, stop words, and term frequency-inverse document frequency (tf-idf). Additional features also include details for Parquet such as row groups identifiers. In Parquet, a row group is a horizontal partition.

Term frequency (tf) is a count of occurrences of a word in a document such as a semi-structured document. Inverse document frequency (idf) is a logarithmically-scaled inverse of the fraction of documents that contain the word, such as: log N/n, where N is a count of indexed documents, and n is a count of those documents that contain the word. Tf-idf=tf×idf. For example, a word that occurs in every document, such as "the", has an idf of zero and a tf-idf of zero, which is the minimum idf and tf-idf. Words whose tf-idf falls below a threshold may be treated as stop words, which should not be indexed and should not have a bitmap such as presented herein. In an embodiment, additional stop words are provided by a blacklist of common words such as "the".

Figure 5:
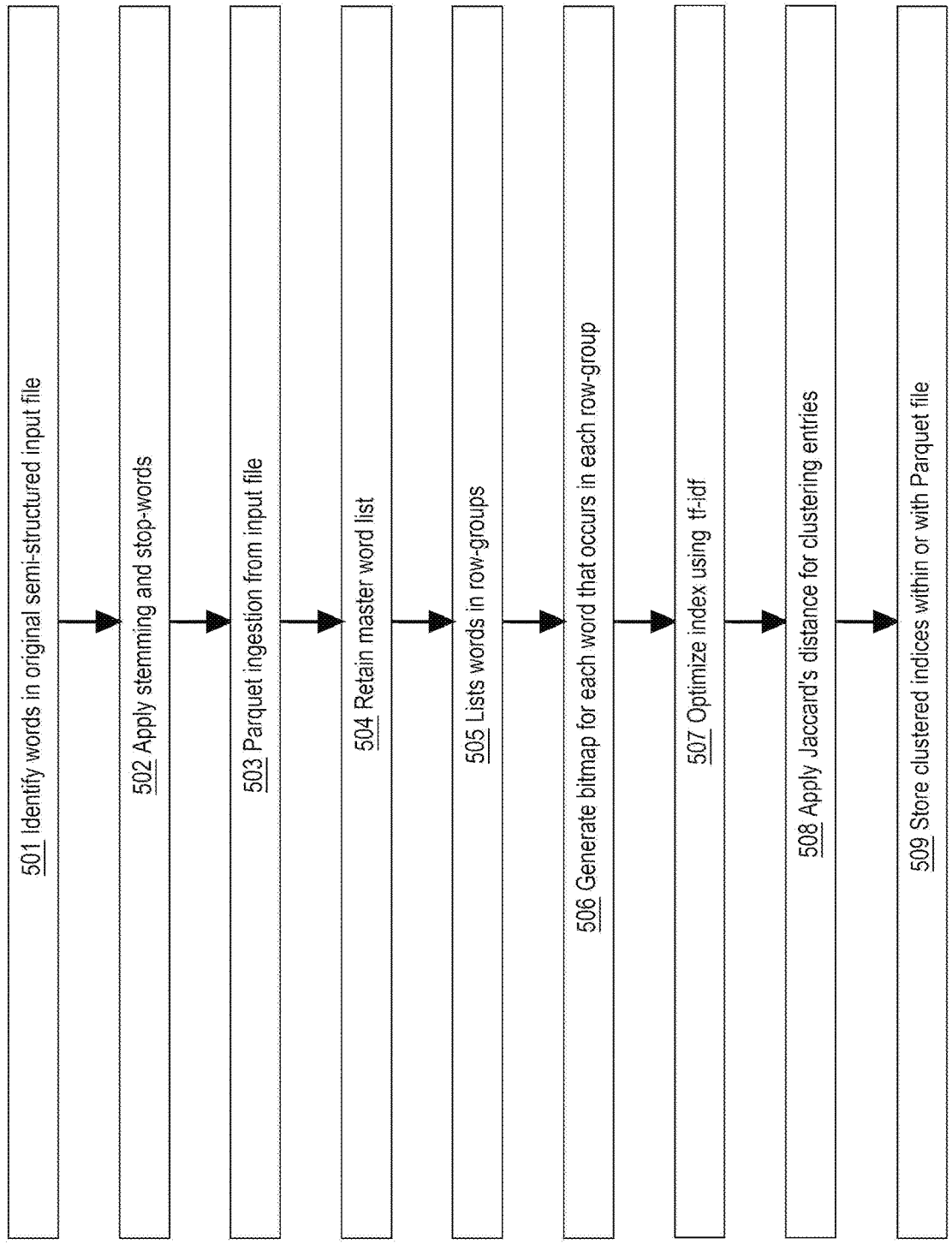
FIG. 5 is a flow diagram that depicts how exemplary ingestion and index formation may proceed.

FIG. 5 is a flow diagram that depicts how exemplary ingestion and index formation may proceed according to the following steps 501-509 that occur in the following ordering:

501. Identify all the words in the original semi-structured input file. Depending on the application requirement, the system could identify both: a) the actual data words (such as words in a "title" field in a JSON document), and b) the structural words (such as keys in JSON), or omit the structural words.

502. Amongst the identified words in step 1, the system applies stemming and stop-words as an optional step, to trim those words from the index because stop words are expected to be rarely, if ever, searched. These very common words are typically not searched because they have very low discriminating value. Stemming entails indexing a word based on its linguistic stem rather than the whole word. For example, 'ran' and 'running' may be indexed as a same single stem word 'run'. For example, run's bitmap may ambiguously match 'run', 'ran', and 'running'. Accommodating ambiguity is discussed earlier herein.

503. The system starts the Parquet ingestion for the input file. During the ingestion, the system also maintains the progress of the input text ingested so far. When a row-group boundary is reached, the system gets a words list where each word has a bitmap indicating whether the word occurs in each column. The system also assigns the current row-group with an at least partially numeric logical identifier. This logical identifier is a universally unique identifier (UUID) for that row-group. The exact algorithm for assigning this UUID may vary between embodiments, as long as there are no or almost no conflicts to this UUID in the entire set of semi-structured documents. One example of a UUID for a row-group might be the Parquet file name and offset. Another example may be a message digest (MD5) hash of the entire file, as a substitute for the file name. This is useful in cases of files where a unique file name is not available—for example, when a log file is overwritten in-place or it can occur when a stream is being ingested, with each horizontal partition of the stream getting its own UUID, even though the stream name itself does not change. In addition, each row-group can be MD5 hashed into a row-group UUID in a completely independent manner. The requirement only is that the probability of collisions among these hashes is vanishingly small across a data lake.

504. At the end of ingestion, the system has a list of words for all the ingested row-groups. This is the master word list.

505. Given the master word list, the system lists all the words in all the row-groups, which have been selected past the stop-words criteria. Each of these words is given an arbitrary but unique ordinal number.

506. From the word list, the system prepares a bitmap for each word that occur in each row-group. These bitmaps form the first order index to the file.

507. The system optimizes the index using tf-idf, so that frequently occurring words can be discarded from the index creation process. If a word is occurring in a majority of the columns and row-groups, then accessing them will take the same amount of time as the full table scan, and hence it is not as beneficial to create an index for the word.

508. Once the index size has been reduced, the system applies the Jaccard's distance to cluster its entries. All words that are within some threshold of Jaccard distance are clustered together. This is the step that results in significant reduction in index size with a given false-positives rate. For example, a semi-structured file is ingested into a five-column Parquet file. There are two row-groups created. Words T1 and T2 occur in some columns of them. They will be clustered together and have a single index if the Jaccard distance (aka threshold) is >0.7. Generally, a higher threshold on the Jaccard similarity means a lower percentage of words to be clustered in each cluster. This is because higher similarity threshold allows words with higher similarity to be clustered. In addition, the value of the threshold is directly proportional to the size of the index because a higher threshold leads to less clustering and larger size of the index. The clustering step described in step 8 is time consuming. The time to cluster words increases nearly linearly with the number of words to be indexed. Therefore, this should be done in a cloud-computing environment where significant CPU and memory is available to hold the working set. For example, this step can be done at periods of low cloud utilization, since there is urgency for this step to be done. By prioritizing this workload to a low level, the additional burden on cloud operations can be minimized.

509. When finishing the ingest procedure, these clustered indices are together stored with the resulting Parquet file. Indices can either be stored as part of the Parquet file by enriching the metadata with extra index information, or be stored as a separate file. Techniques for customizing metadata in a Parquet file are presented in related U.S. patent application Ser. No. 16/814,855 "PERSONAL INFORMATION INDEXING FOR COLUMNAR DATA STORAGE FORMAT".

5.1 Exemplary Query Operation

During query execution, the system inspects the bitmap(s) of a keyword to get all the parquet row-groups possibly containing the searching keyword (i.e. any row-group with at least one column having a TRUE bit for the searching keyword). Since the indexing algorithm has false positives, so it might identify row-groups where the word has a likelihood of occurrence. Generally a higher threshold during the indexing leads to a lower ratio of false positives, with the cost of a larger index size.

After the system obtains the candidate row-groups, the system uses the column bit to decide which column the system needs to access and/or load. For a standard Parquet reader requiring the same set of columns loaded for each row-group, the system should apply bitwise-or to the bitmaps of all row-groups to get the columns list, i.e. a column will be loaded if any row-group has the corresponding column bit to be TRUE.

There is an enormous reduction in I/O because the number of I/O blocks being read from disk has been pruned. Because disk I/O is at least 1000 times slower than CPU processing per kilobyte, this yields in significant reduction in query times for free-text searches. There is significant improvement (several orders of magnitude) on the query time utilizing the bitmaps herein.

Once the candidate columns and row-groups are identified, the row-group UUIDs in the system metadata is consulted to identify the row-groups, and the columns are used to identify the projection columns. This information is returned to the user as a result and the query completes. The user can choose to operate on this result as is, such as reading the data in those columns and row-groups through standard Parquet.

6.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

6.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
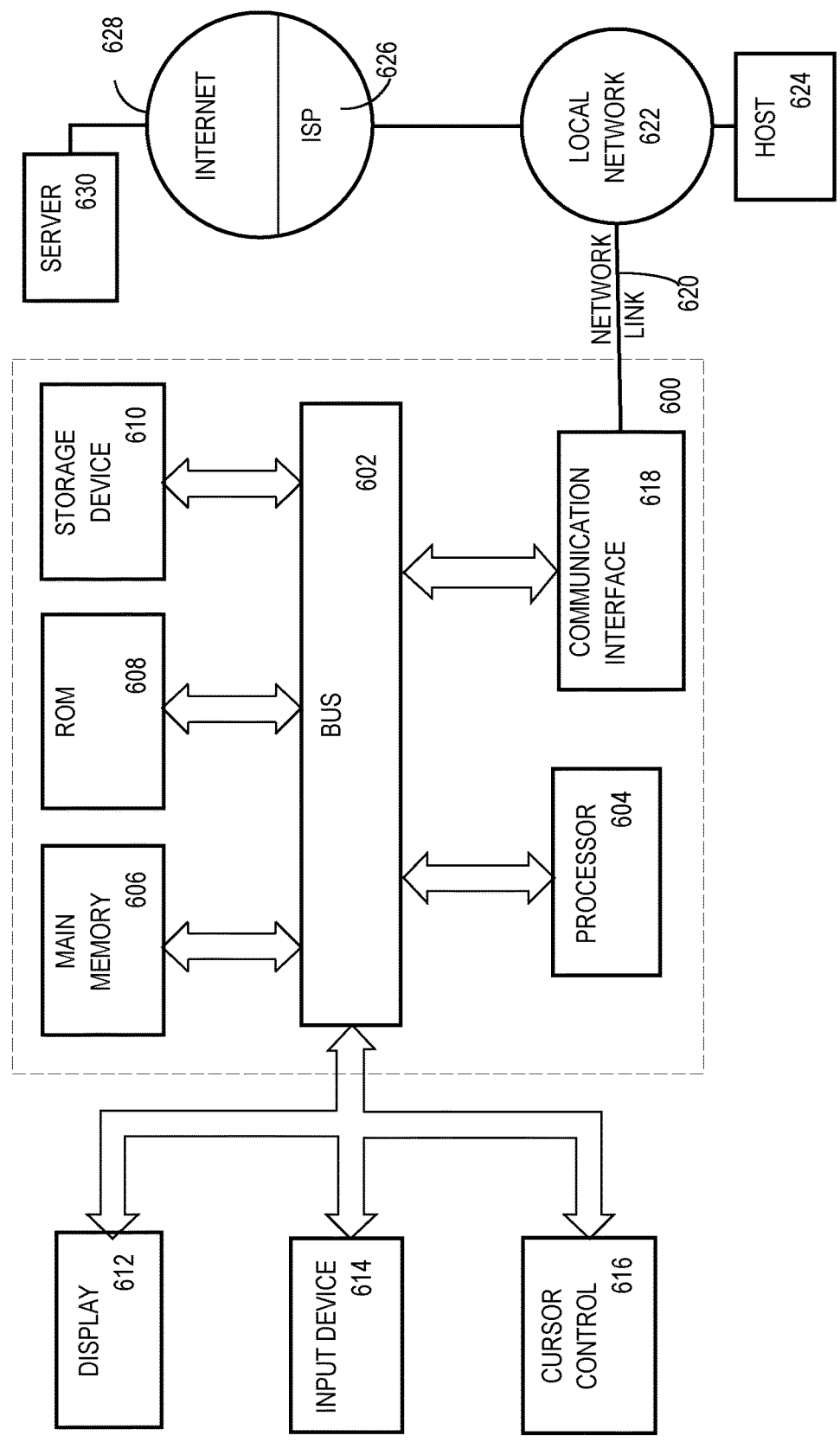
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
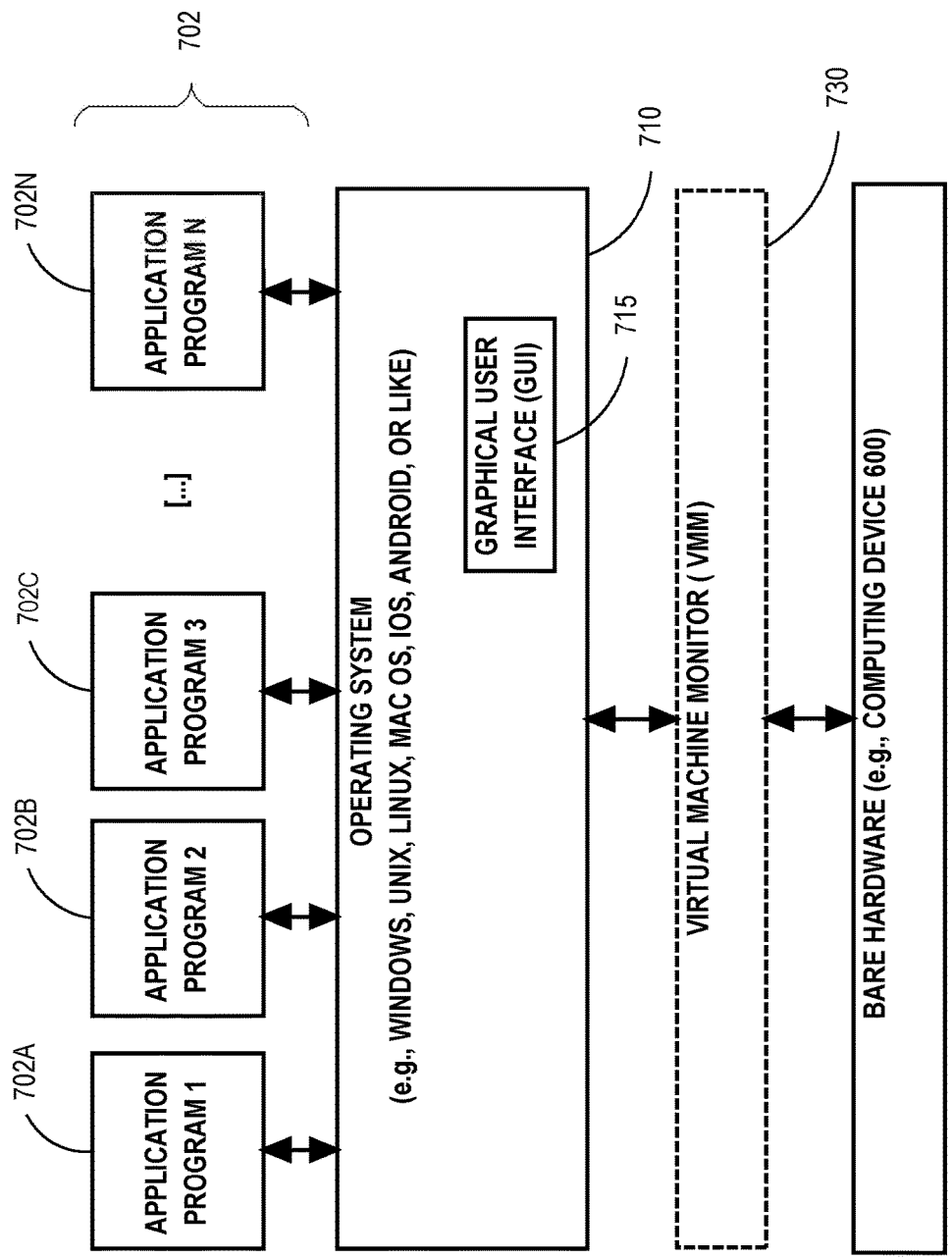
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 700 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    associating a plurality of columns with a plurality of text strings that occurs in a plurality of semi-structured documents;
    detecting a plurality of text words that occur in said plurality of text strings;
    generating, respectively for each text word of the plurality of text words, a bitmap, of a plurality of bitmaps, that contains a respective bit for each column of the plurality of columns;
    accessing, based on at least one bitmap of the plurality of bitmaps, at least one column of the plurality of columns.

2. The method of claim 1 further comprising:
    measuring a similarity between a first bitmap of a first text word of the plurality of text words and a second bitmap of a second text word of the plurality of text words;
    replacing, in the plurality of bitmaps and based on said measuring said similarity, the first bitmap of the first text word and the second bitmap of the second text word with a single bitmap that has a single respective bit for each column of the plurality of columns.

3. The method of claim 2 wherein said measuring said similarity between the first bitmap and the second bitmap comprises a Jaccard distance.

4. The method of claim 2 wherein said accessing based on said at least one bitmap comprises:
    detecting, based on the respective bit of said single bitmap for a particular column of the plurality of columns, that a value of the particular column contains at least one of: the first text word and the second text word;
    detecting that said value of the particular column contains the first text word and not the second text word.

5. The method of claim 2 wherein:
    said generating said first bitmap of said first text word comprises:
        generating a first instance of the first bitmap for a first portion of each column of the plurality of columns, and
        generating a second instance of the first bitmap for a second portion of each column of the plurality of columns;
    the method further comprises persisting the first portion in a first file and the second portion in a second file;
    said accessing based on said at least one bitmap comprises, based on said second instance of the first bitmap, not accessing the second file nor the second portion.

6. The method of claim 5 further comprising:
    populating, from a first one or more text documents, said first portion of each column of the plurality of columns;
    populating, from a second one or more text documents, said second portion of each column of the plurality of columns.

7. The method of claim 1 further comprising accessing, based on said at least one column of the plurality of columns, at least one semi-structured document of the plurality of semi-structured documents.

8. The method of claim 1 wherein the plurality of text words comprises:
    a third text word that is a name of a property, and
    a fourth text word that is part of a value of said property.

9. The method of claim 8 further comprising persisting, in a same file, said at least one bitmap and said value of said property.

10. The method of claim 1 wherein:
    the method further comprises persisting a first column of the plurality of columns in a first file and a second column of the plurality of columns in a second file;
    said accessing based on said at least one bitmap comprises, based on said at least one bitmap, not accessing the second file nor the second column.

11. The method of claim 1 further comprising generating, based on said accessing based on said at least one bitmap, data that is redacted based on said at least one bitmap of the plurality of bitmaps.

12. One or more non-transitory computer-readable media storing instructions that, when executed by one or more processors, cause:
    associating a plurality of columns with a plurality of text strings that occurs in a plurality of semi-structured documents;
    detecting a plurality of text words that occur in said plurality of text strings;

generating, respectively for each text word of the plurality of text words, a bitmap, of a plurality of bitmaps, that contains a respective bit for each column of the plurality of columns;

accessing, based on at least one bitmap of the plurality of bitmaps, at least one column of the plurality of columns.

13. The one or more non-transitory computer-readable media of claim 12 wherein the instructions further cause:

measuring a similarity between a first bitmap of a first text word of the plurality of text words and a second bitmap of a second text word of the plurality of text words;

replacing, in the plurality of bitmaps and based on said measuring said similarity, the first bitmap of the first text word and the second bitmap of the second text word with a single bitmap that has a single respective bit for each column of the plurality of columns.

14. The one or more non-transitory computer-readable media of claim 13 wherein said measuring said similarity between the first bitmap and the second bitmap comprises a Jaccard distance.

15. The one or more non-transitory computer-readable media of claim 13 wherein:

said generating said first bitmap of said first text word comprises:
generating a first instance of the first bitmap for a first portion of each column of the plurality of columns, and
generating a second instance of the first bitmap for a second portion of each column of the plurality of columns;

the instructions further cause persisting the first portion in a first file and the second portion in a second file;

said accessing based on said at least one bitmap comprises, based on said second instance of the first bitmap, not accessing the second file nor the second portion.

16. The one or more non-transitory computer-readable media of claim 12 wherein the instructions further cause accessing, based on said at least one column of the plurality of columns, at least one semi-structured document of the plurality of semi-structured documents.

17. The one or more non-transitory computer-readable media of claim 12 wherein the plurality of text words comprises:

a third text word that is a name of a property, and a fourth text word that is part of a value of said property.

18. The one or more non-transitory computer-readable media of claim 17 wherein the instructions further cause persisting, in a same file, said at least one bitmap and said value of said property.

19. The one or more non-transitory computer-readable media of claim 12 wherein:

the instructions further cause persisting a first column of the plurality of columns in a first file and a second column of the plurality of columns in a second file;

said accessing based on said at least one bitmap comprises, based on said at least one bitmap, not accessing the second file nor the second column.

20. The one or more non-transitory computer-readable media of claim 12 wherein the instructions further cause generating, based on said accessing based on said at least one bitmap, data that is redacted based on said at least one bitmap of the plurality of bitmaps.

* * * * *